United States Patent [19]

Kelly et al.

[11] Patent Number: 4,847,789

[45] Date of Patent: Jul. 11, 1989

[54] METHOD FOR HIDDEN LINE REMOVAL

[75] Inventors: Robert E. Kelly, Lidingö, Sweden; Peter D. Welch, Kisco, N.Y.

[73] Assignee: International Business Machines Corporation, Armonk, N.Y.

[21] Appl. No.: 882,315

[22] Filed: Jul. 7, 1986

[30] Foreign Application Priority Data

Jul. 8, 1985 [SE] Sweden .................................. 8503392

[51] Int. Cl.$^4$ ............................................ G06F 15/72
[52] U.S. Cl. ....................................... 364/522; 340/729
[58] Field of Search ................ 364/518, 520, 522, 521; 340/729, 724

[56] References Cited

U.S. PATENT DOCUMENTS

| | | | |
|---|---|---|---|
| 3,671,729 | 6/1972 | Lux | 364/520 |
| 4,181,953 | 1/1980 | Osofsky | 364/522 X |
| 4,222,048 | 9/1980 | Johnson | 340/747 |
| 4,412,296 | 10/1983 | Taylor | 364/521 |
| 4,583,185 | 4/1986 | Heartz | 364/522 X |
| 4,594,673 | 6/1986 | Holly | 364/522 |
| 4,623,880 | 11/1986 | Bresenham et al. | 340/744 X |

FOREIGN PATENT DOCUMENTS 0151274  8/1985 Fed. Rep. of Germany .

OTHER PUBLICATIONS

H. Williamson, "Algorithm 420 Hidden-Line Plotting Program [J6]" Communication of the ACML, Feb. 1972, vol. 15, No. 2, pp. 100–103.

A. Fujimoto et al., "A 3-D Graphics Display System With Depth Buffer and Pipeline Processor", IEEE Computer Graphics Application, vol. 4, No. 6, Jun. 1984, pp. 11–23.

A. Appel et al., "Haloed Line Effect", IBM Technical Disclosure Bulletin, vol. 21, No. 4, Sep. 1987, pp. 1715–1716.

Primary Examiner—Gary V. Harkcom
Assistant Examiner—Mark K. Zimmerman
Attorney, Agent, or Firm—Jack M. Arnold

[57] ABSTRACT

A method for removing hidden lines in a two-dimensional surface chart disclosing an image of a three-dimensional surface, includes storing the X, Y and Z co-ordinates of selected points (A, B, C, D, E) of the surface as a first matrix, transforming the first matrix into a second matrix indicating the drawing sequence through the selected points, rotating the points of the second matrix around the Z-axis a first angle $\alpha$, rotating the second matrix points a second angle $\beta$ and drawing the two-dimensional surface chart in accordance with the indicated sequence using the X and Y co-ordinate values of the rotated points. The drawing sequence comprises a drawing operation of X-traces, an X-trace being defined as a line passing through points having substantially the same Y values in the first matrix, the drawing operation of one X-trace being followed by a plurality of $\Delta$Y-trace drawing operations between the last drawn X-trace and the next to be drawn X-trace, an Y-trace being defined as a line passing through points having substantially the same X values in the first matrix and a $\Delta$Y-trace being defined as the part of an Y-trace falling between two adjacent X-traces, said sequential drawing operation proceeding in sequence from low Y value X-traces toward high value X-traces. No lines are drawn inside a forbidden area being defined as an area surrounded by an upper horizon and a lower horizon.

19 Claims, 10 Drawing Sheets

METHOD FOR HIDDEN LINE REMOVAL

The present invention relates to a method for hidden line removal in a surface chart.

A surface chart, it is noted, is a representation of a continuous surface in 3-space of a function of two variables by a set of points whose projection onto some plane in 3-space results in a rectangular grid of equidistantly spaced points.

The IBM Technical Disclosure Bulletin September 1978, pp 1715-1716, author Appel et al, describes a modified hidden line removal algorithm imparting a sense of depth and orientation to a computer generated graphic image of a three dimensional object without requiring the complete elimination of all hidden lines, thereby avoiding the large overhead of a complete algorithm.

IEEE Computer Graphics Appl. vol. 4 no. 6, June 1984, p 11-23, author Fuyimoto et at, describes an algorithm for hidden surface removal using triangles in three dimensional image processing.

An object of the present invention is to provide a simple method for performing hidden line removal on a two-dimensional image of a three-dimensional surface chart. Another object of the present invention is to provide a method for a high resolution hidden line removal in a two-dimensional image displaying a three-dimensional surface chart.

The present invention can favorably be implemented using an APL (A Programming Language) matrix operation. The present invention is disclosed in the attached claims.

Figure 1:
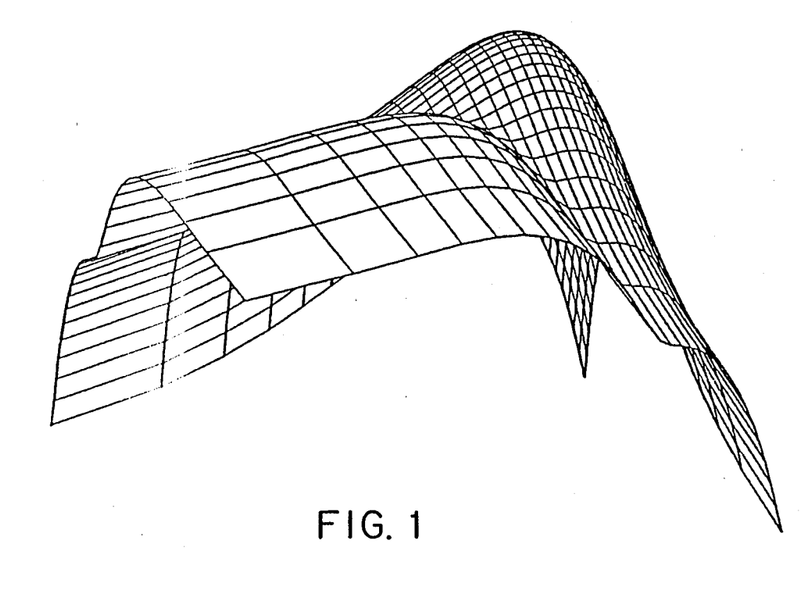
FIG. 1 discloses a two-dimensional surface chart with removed hidden lines according to the present invention.

The invention will now be described with reference to the attached drawings in which:

FIG. 1 is an example of a two-dimensional surface chart providing an image of a three-dimensional surface. This chart gives a three-dimensional impression to the viewer because all of the hidden lines have been removed and this chart presents the final result of a drawing method according to the present invention.

Figure 2:
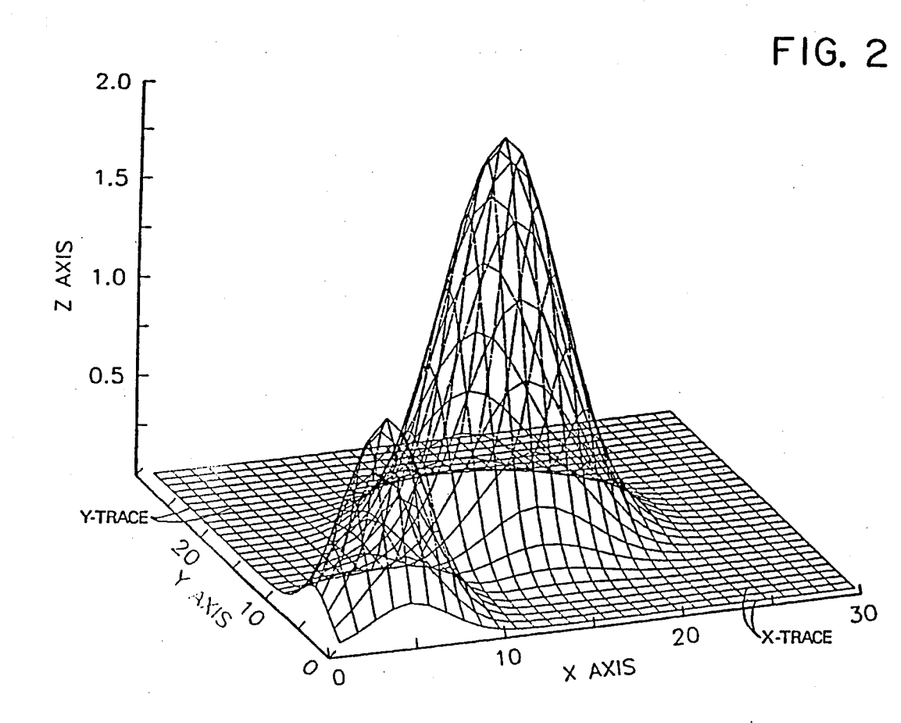
FIG. 2 discloses a two-dimensional surface chart including all hidden lines.

FIG. 2 represents another example of a two-dimensional surface chart according to the present invention. However, in this chart all the hidden lines are still in the picture. Therefore the viewer of the picture does not get a three-dimennsional impression of the image.

The chart is drawn in a co-ordinate axis system comprising an X-axis, a Y-axis and a Z-axis. The lines parallel to the X-axis are called X-traces and the lines parallel to the Y-axis are calleld Y-traces.

Figure 3:
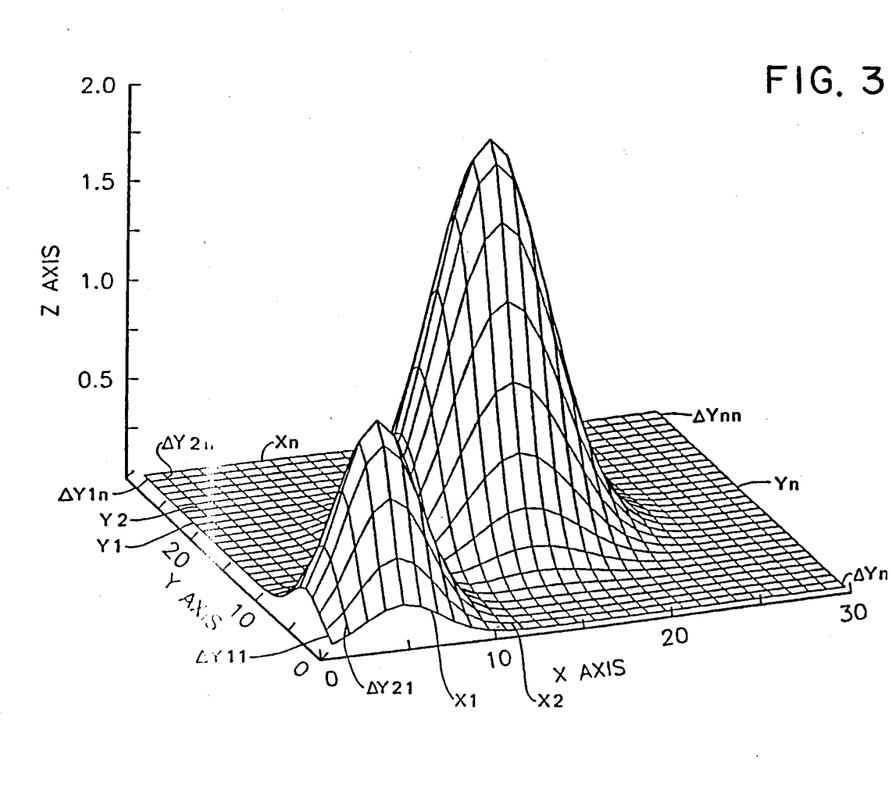
FIG. 3 discloses a surface chart similar to FIG. 2 where all the hidden lines have been removed.

FIG. 3 discloses the same surface image as FIG. 2, however all the hidden lines are removed according to the present invention.

All the X-traces are shown as lines X1, X2. . . Xn and the Y-traces are shown as lines Y1, Y2. . . Yn. In this figure n=30.

All the X-traces are cutting each Y-trace into n-1 segments. The first Y-trace, Y1 is cut into n-1 segments starting at $\Delta Y11$, $\Delta Y12$ . . . $\Delta Y1N$. The second Y-trace, Y2 comprises $\Delta Y21$, $\Delta Y22$ . . . $\Delta Y2N$. Similarly the last Y-trace Yn comprises $\Delta Yn1$, $\Delta Yn2$ . . . $\Delta Ynn$.

The two-dimensional surface chart of FIG. 3 is drawn using the method of the present invention as follows:

1. The X, Y, Z co-ordinates of allthe crossspoints for all X and Y traces will be stored into a matrix.

2. The stored data in the matrix will first be modified by a co-ordinate rotation round the Z-axis of a selected angle alpha.

3. The modified data in the matrix will be subject to a second modification through a second co-ordinate rotation around the X-axis of a selected second angle beta.

4. The first Y-trace, Y1 will be drawn using the modified data from the matrix.

5. The first X-trace, X1 will be drawn using the modified data in the matrix.

6. $\Delta Y21$, $\Delta Y31$ . . . $\Delta Yn1$ will be drawn.

7. X2 will be drawn.

8. X1 will be defined as a lower horizon and X2 as an upper horizon. The area between the upper and the lower horizon is defined as a forbidden area, no lines shall be drawn in this area.

9. $\Delta Y22$, $\Delta Y32$ . . . $\Delta Yn2$ will be drawn.

10. X3 will be drawn. X3 will replace X2 as the new horizon.

11. The drawing operation will continue alernating between drawings for a plurality of delta Y values and drawings of an X-trace. Each newly drawn X-trace will modify the forbidden area such that no later drawings are allowed inside this forbidden area.

Figure 4:
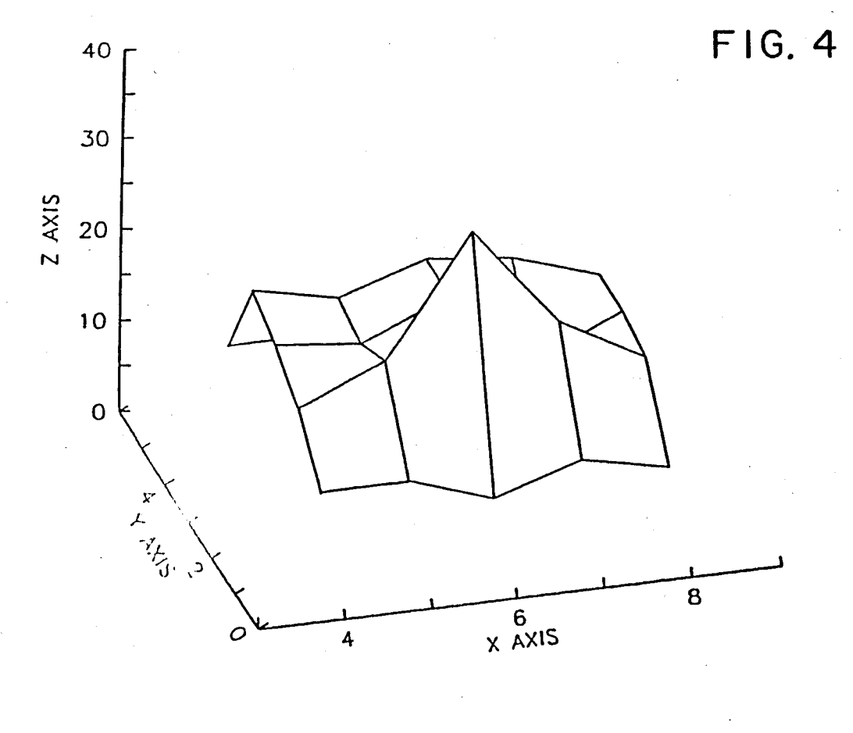
FIG. 4 discloses a two-dimensional surface chart for a 25 point surface with all hidden lines removed according to the present invention.
Figure 5:
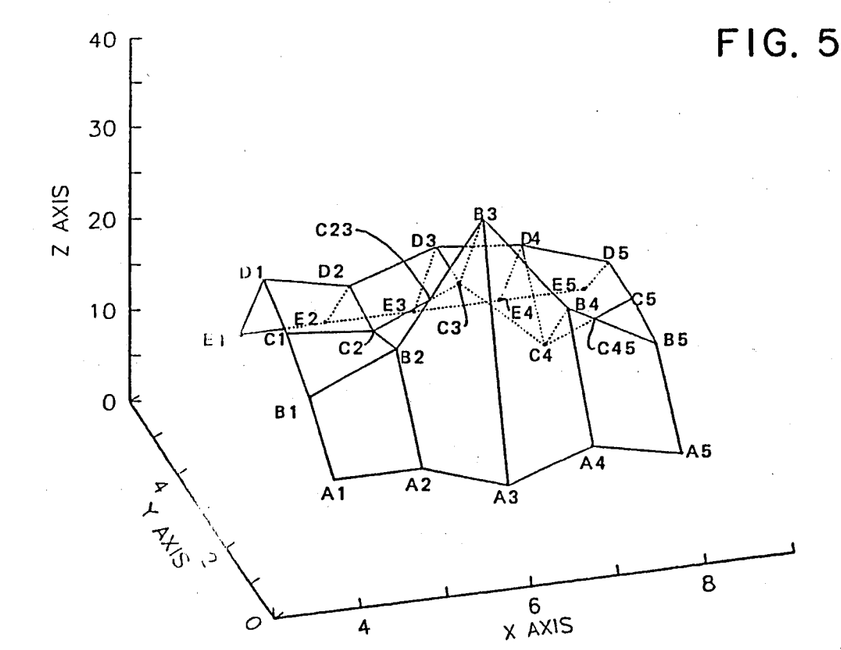
FIG. 5 discloses a similar surface chart as FIG. 4 with the hidden lines indicated with dotted lines.

FIG. 4 and FIG. 5 disclose a 25 point surface chart, FIG. 4 with all the hidden lines removed and FIG. 5 with the hidden lines shown with dotted lines. In FIG. 5 the first X-trace is represented by the points A1, A2, A3, A4 and A5. Similarly the second X-trace is represented by the points B1-B5, the third X-trace by the point C1-C5, the fourth X-trace by D1-D5 and the fifth X-trace by E1-E5.

The first Y-trace comprises the points A1, B1, C1, D1 and E1. The second Y-trace comprises the points A2—E2, the third Y-trace comprises the points A3—Y3 etc. A cross-point between C2 C3 and B2 B3 is designated C23 and a cross-point between B4 B5 and C4 C5 is designated C45.

The co-ordinate values for the points shown in FIG. 5 are disclosed in the Z-matrix of TABLE 1 in the Appendix.

According to the TABLE 1 point A1 in FIG. 5 has the values X=4, Y=1, Z=10 and point A2 X=5, Y=1, Z=10 etc.

According to the present invention the Z-matrix of TABLE 1 will be rearranged into a drawing sequence. This is shown in TABLE 2 in the Appendix.

In TABLE 2 the first column is a printcode. When the printcode is zero it means that no drawing will occur at the point represented by the corresponding X, Y, Z co-ordinates. When the printcode is 101, it means that a line is drawn from the previous point to the point represented by the corresponding X, Y, Z co-ordinates.

The five first lines of TABLE 2 determine that a line will be drawn from point A1 to B1, C1, D1, E1 as described previously. Line 6 tells that no drawing will be made when moving from point E1 to point A1 according to FIG. 5.

The lines 7–10 of the TABLE determine the drawing operation of the first X-trace A1–A5. The lines 11–18 of the TABLE disclose the drawing of delta Y-lines A2—B2, A3–B3, A4–B4 and A5–B5. Next the lines 19–23 disclose the drawing of the second X-trace B1–B5. The rest of the TABLE is built up similarly with alternating Y-traces and X-traces.

It should be noted that no printing or drawing will actually occur during the processing of TABLE 2, only the drawing sequence will be set up when TABLE 2 is assembled.

Next an aspect transformation is performed according to the following statements:

New $X = (X - 3) \times 0{,}833$
New $Y = Y \times 0{,}833$
New $Z = Z \times 0{,}0938$ TABLE 3 in the Appendix.

The next step is a rotation round the Z-axis. The TABLE 4 below will disclose the new co-ordinate values when a rotation of 15 degrees ($\alpha = 15°$) around the Z-axis has been performed.

TABLE 4 in the Appendix.

Next a 65 degree rotation around the X-axis will be performed ($\beta = 65°$).

TABLE 5 in the Appendix.

The following step is a projection into the X-Y plane that will contain the two-dimensional image of the surface chart. This is a very easy transformation, all Z-values are omitted.

TABLE 6 in the Appendix.

A final transformation will now be performed including an origin transformation ($X0 = 1312{,}3$, $Y0 = 370{,}0$) and a magnitude transformation where $M = 414{,}6$. The object of these transformations is to map the image of the surface chart into the coordinate system of the graphics display device.

TABLE 7 in the Appendix.

Figure 6:
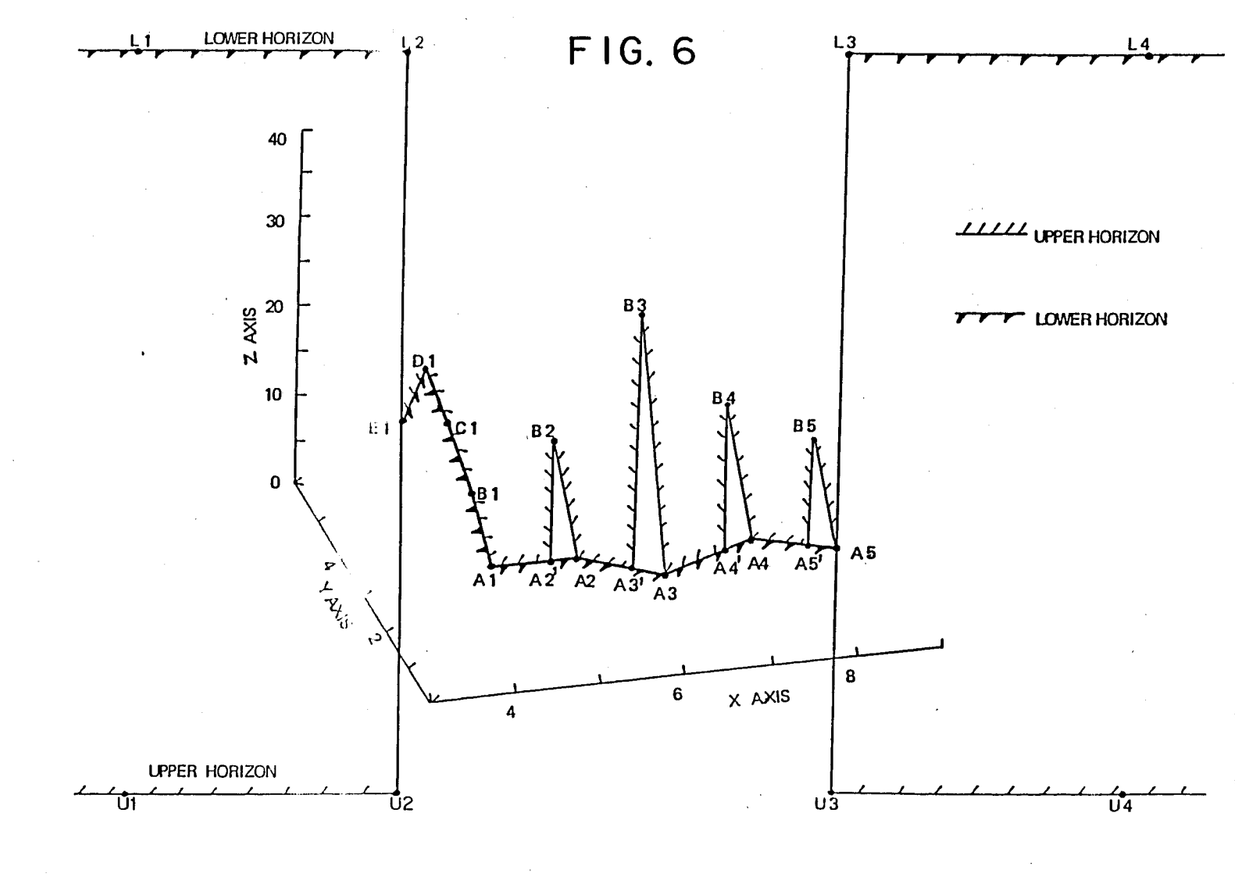
FIG. 6 and FIG. 7 discloses a part of the surface chart of FIG. 5 indicating upper and lower horizon lines.
Figure 7:
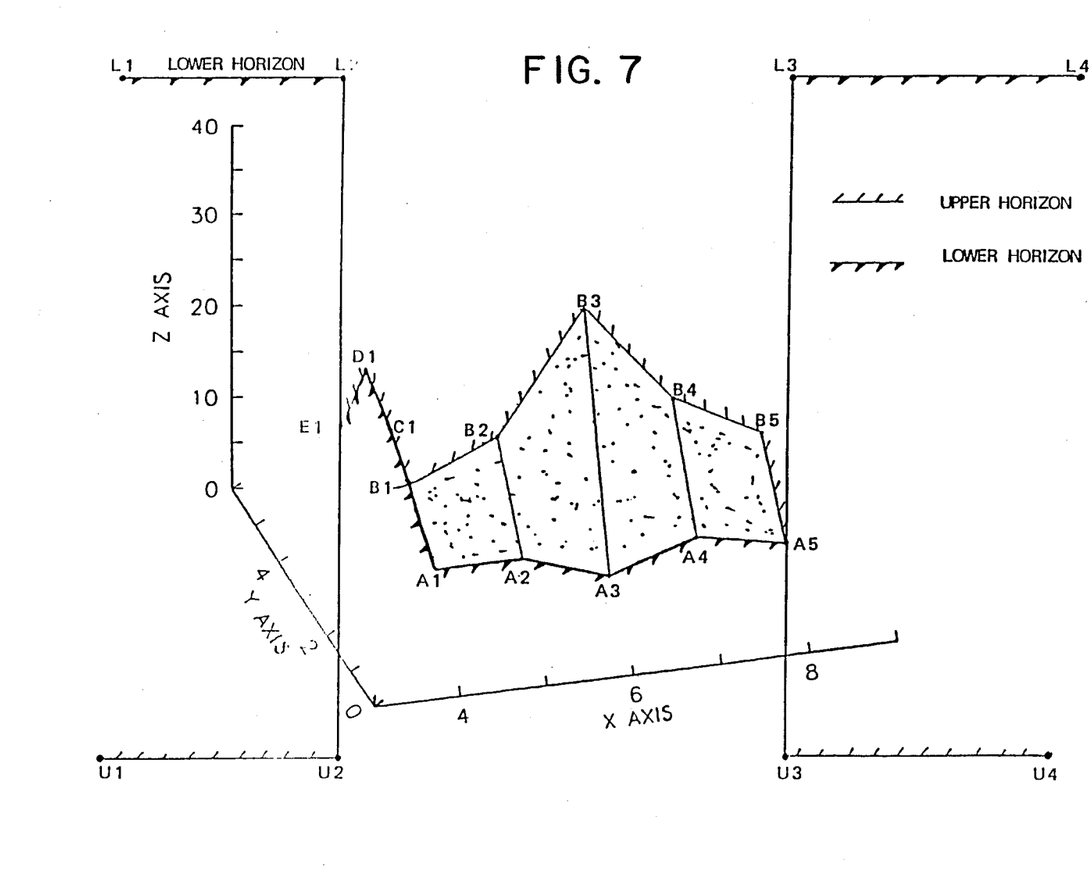

TABLE 7 is the final matrix used to draw the two-dimensional surface chart disclosed in FIG. 5. It should however be noted that FIG. 5 includes all the hidden lines. All the hidden lines should be removed according to the method disclosed in FIG. 6 and FIG. 7.

According to the previous description the drawing operation will start by drawing the first Y-trace, the line A1, B1, C1, D1, E1 and will continue with the first X-trace, the line A1, A2, A3, A4, A5. An upper horizon will then be established along the points U1, U2, E1, D1, C1, B1, A1, A2, A3, A4, A5, U3, U4. In this upper horizon line the points U represent substantially low values. Similarly a lower horizon will be established along the points L1, L2, E1, D1, C1, B1, A1, A2, A3, A4, A5, L3, L4. The lower horizon points L represent substantially high values.

It can be seen that in this state of the drawing process, corresponding to the rows 1–10 of the various matrixes, the upper horizon and the lower horizon are overlapping each other in the area of the 25-point matrix. However, during the processing steps disclosed on the rows 11–18 of the tables, see FIG. 6, an upper horizon is established along the points U1, U2, E1, D1, C1, B1, A1, A2', B2, A2, A3', B3, A3, A4', B4, A4, A5', B5, A5, U3, U4. The upper horizon includes spikes due to the $\Delta y$ drawing steps. During the drawing steps 19–23, see FIG. 7, the upper horizon is updated to the points U1, U2, E1, D1, C1, B1, B2, B3, B4, B5, A5, U3, U4. The lower horizon is however unchanged along the points L1, L2, E1, D1, C1, B1, A1, A2, A3, A4, A5, L3, L4. The forbidden area is now represented by the area between the upper horizon and the lower horizon, the area surrounded by the lines A1, B1, B2, B3, B4, B5, A5, A4, A3, A2, A1. The forbidden area will continuously increase when the drawing operation continues.

Turning back to FIG. 5 and TABLE 2 it can be seen that the tablerow 25 indicates the drawing of a line from point B2 to point C2. This is not within the forbidden area and hence this line will be drawn. The tablerow 26 indicatieis a jump from point C2 to point B3. The next tablerow 27 however indicates a drawing operation from point B3 to point C3. According to FIG. 5 this line will be within the forbidden area and is hence indicated as a dotted line. Therefore this line is not shown in the final picture of FIG. 4. Row 27 in TABLE 2 discloses therefore the first hidden line to be removed. The same is true of course also for tablerow 27 in the final TABLE 7.

Returning again to FIG. 5 and TABLE 2 it can be seen that the next hidden line to be removed is disclosed on a tablerow 29 representing the dotted line B4–C4. The next delta Y-line represented by the tablerow 31 and shown in FIG. 5 as the line B4–C5 is not within the forbidden area and will be fully drawn.

When the next X-trace C1–C5 will be drawn according to the tablerows 33–36 in TABLE 2, the upper horizon will change from B1, B2, B3, B4, B5 to C1, C2, C23, B3, B4, C45, C5, B5. This horizon sector includes two interesting points, i.e. C23 and C45. This means that the lines C2–C3 shall be drawn from the point C2 until point C23, but no drawing shall occur from point C23 to C3. Similarly the hidden line C4–C45 shall not be drawn but the line C45–C5 shall be drawn.

The problem of removing partial hidden lines such as the lines C23–C3 and C4–C45, is solved according to the present embodiment of the invention as follows:

The drawing of a sector line such as the sectorline C1–C2 is drawn according to a plurality of incremental lines, say in the order of a hundred steps between the point C1 and C2. For each such incremental drawing step a check is made whether the actual position of the drawing step is within or outside the forbidden area. This means that when the drawing process proceeds from point C2 toward the point C23, the checking operation indicates that each incremental drawing step is outside the forbidden area. The contrary will be true after point C23 has been past and the drawing operation continues towards point C3.

Figure 8:
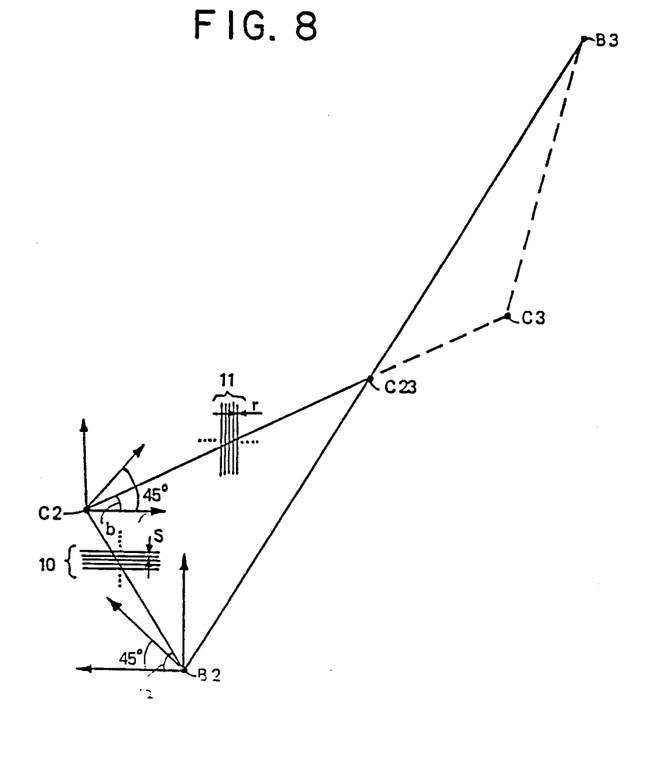
FIG. 8 discloses a detailed picture of the drawing steps used according to the present invention.
Figure 9:
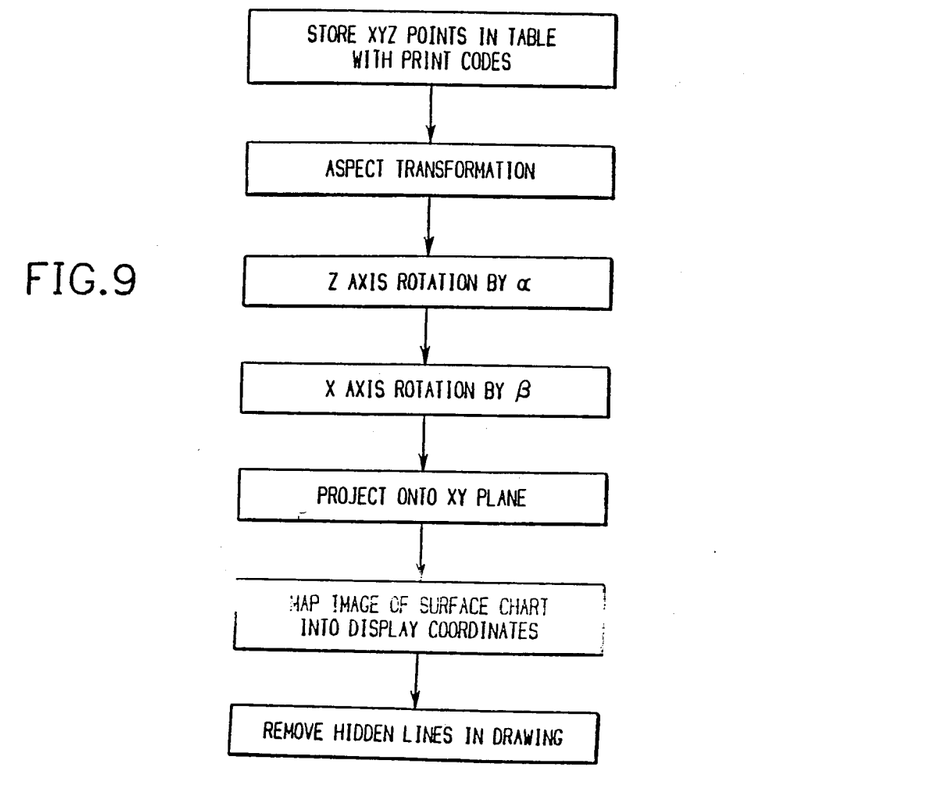
FIG. 9 is a flowchart of the invention as applied.
Figure 10:
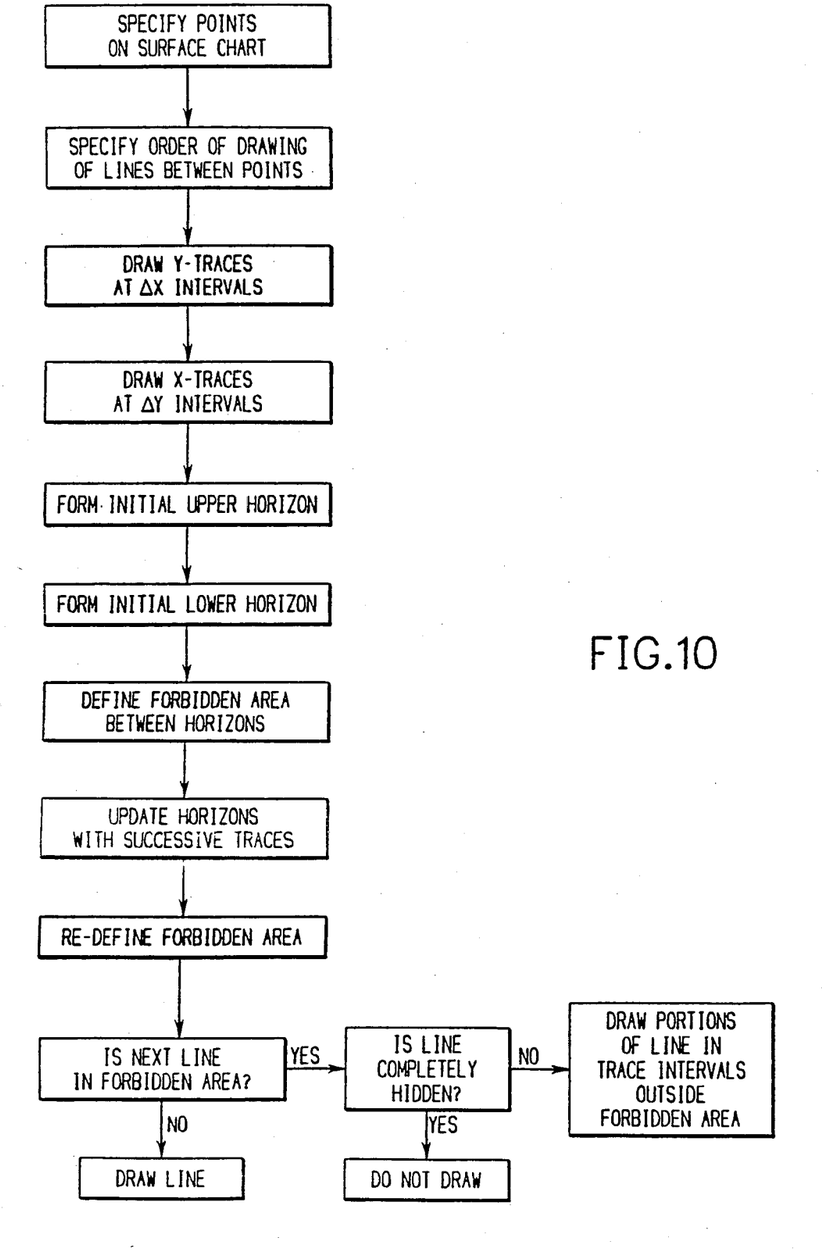
FIG 10. is a flowchart of an algorithm for removing hidden lines according to the invention.

FIG. 8 discloses in more detail the method of drawing a line from the point B2 to the point C2 and similarly from point C2 towards point C3 in FIG. 5.

In case the angle "a" between the X-axis and the line to be drawn from B2 to C2 is larger than 45°, then the line will be drawn in incremental steps of "s" using X-rasters 10. When, however the corresponding angle "b" for the points C2, C3 is less than 45°, then the line will be drawn in incremental steps of "r" using Y-rasters 11. This is an easy operation when an APL programming language is used.

It should be considered that the present invention can favorably be used for various rotational angles α and β. In case the angle α for the Z-axis rotation is over 45°, then the drawing rules for the x and y co-ordinates must be exchanged. This means that the drawing sequence will be as follows:

1. The first X-trace is drawn.
2. The first Y-trace is drawn.
3. The first plurality of Δ X-trace are drawn.
4. The second Y-trace is drawn.
5. The second plurality of Δ X-traces are drawn.
6. The third Y-trace is drawn etc.

It should further be considered that the rotational angles can be over 90° and both positive and negative, whereby the drawing sequences must be adjusted accordingly.

It should also be considered that the incremental line drawing operations can be avoided by updating the various table values with cross point co-ordinate values for such cross points as C23, C45 etc. Such an updating operation can preferably be made when the horizon information is updated.

Summarizing it can be said that according to one embodiment of the present invention a method is disclosed for producing a first plurality of tables for the coordinate values for various corner points and cross points, a second table for the upper horizon, and a third table for the lower horizon, whereby the amount of information stored in the second and third table is a magnitude higher than in the first table.

The present invention is preferably implemented in a system including a work station having a keyboard and a display

APPENDIX

TABLE 1

|  |  | Z MATRIX |  |  |  |  |
|---|---|---|---|---|---|---|
|  |  | X VALUES |  |  |  |  |
|  |  | 4 | 5 | 6 | 7 | 8 |
| Y VALUES | 1 | 10 | 10 | 7 | 10 | 8 | (A1–A5) |
|  | 2 | 15 | 19 | 32 | 21 | 16 | (B1–B5) |
|  | 3 | 18 | 17 | 21 | 13 | 17 | (C1–C5) |
|  | 4 | 20 | 18 | 21 | 20 | 17 | (D1–D5) |
|  | 5 | 10 | 10 | 10 | 10 | 10 | (E1–E5) |

TABLE 2

| ROW | PRINT CODE | X | Y | Z |
|---|---|---|---|---|
| 1 | 0 | 4 | 1 | 10 |
|  | 101 | 4 | 2 | 15 |
|  | 101 | 4 | 3 | 18 |
|  | 101 | 4 | 4 | 20 |
| 5 | 101 | 4 | 5 | 10 |
|  | 0 | 4 | 1 | 10 |
|  | 101 | 5 | 1 | 10 |
|  | 101 | 6 | 1 | 7 |
|  | 101 | 7 | 1 | 10 |
| 10 | 101 | 8 | 1 | 8 |
|  | 0 | 5 | 1 | 10 |
|  | 101 | 5 | 2 | 19 |
|  | 0 | 6 | 1 | 7 |
|  | 101 | 6 | 2 | 32 |
| 15 | 0 | 7 | 1 | 10 |
|  | 101 | 7 | 2 | 21 |
|  | 0 | 8 | 1 | 8 |
|  | 101 | 8 | 2 | 16 |

TABLE 2-continued

| ROW | PRINT CODE | X | Y | Z |
|---|---|---|---|---|
|  | 0 | 4 | 2 | 15 |
| 20 | 101 | 5 | 2 | 19 |
|  | 101 | 6 | 2 | 32 |
|  | 101 | 7 | 2 | 21 |
|  | 101 | 8 | 2 | 16 |
|  | 0 | 5 | 2 | 19 |
| 25 | 101 | 5 | 3 | 17 |
|  | 0 | 6 | 2 | 32 |
|  | 101 | 6 | 3 | 21 |
|  | 0 | 7 | 2 | 21 |
|  | 101 | 7 | 3 | 13 |
| 30 | 0 | 8 | 2 | 16 |
|  | 101 | 8 | 3 | 17 |
|  | 0 | 4 | 3 | 18 |
|  | 101 | 5 | 3 | 17 |
|  | 101 | 6 | 3 | 21 |
| 35 | 101 | 7 | 3 | 13 |
|  | 101 | 8 | 3 | 17 |
|  | 0 | 5 | 3 | 17 |
|  | 101 | 5 | 4 | 18 |
|  | 0 | 6 | 3 | 21 |
| 40 | 101 | 6 | 4 | 21 |
|  | 0 | 7 | 3 | 13 |
|  | 101 | 7 | 4 | 20 |
|  | 0 | 8 | 3 | 17 |
|  | 101 | 8 | 4 | 17 |
| 45 | 0 | 4 | 4 | 20 |
|  | 101 | 5 | 4 | 18 |
|  | 101 | 6 | 4 | 21 |
|  | 101 | 7 | 4 | 20 |
|  | 101 | 8 | 4 | 17 |
| 50 | 0 | 5 | 4 | 18 |
|  | 101 | 5 | 5 | 10 |
|  | 0 | 6 | 4 | 21 |
|  | 101 | 6 | 5 | 10 |
|  | 0 | 7 | 4 | 20 |
| 55 | 101 | 7 | 5 | 10 |
|  | 0 | 8 | 4 | 17 |
|  | 101 | 8 | 5 | 10 |
|  | 0 | 4 | 5 | 10 |
|  | 101 | 5 | 5 | 10 |
| 60 | 101 | 6 | 5 | 10 |
|  | 101 | 7 | 5 | 10 |
| 62 | 101 | 8 | 5 | 10 |

TABLE 3

| ROW | PRINT CODE | X | Y | Z |
|---|---|---|---|---|
| 1 | 0 | 0.833 | 0.833 | 0.938 |
|  | 101 | 0.833 | 1.67 | 1.41 |
|  | 101 | 0.833 | 2.5 | 1.69 |
|  | 101 | 0.833 | 3.33 | 1.87 |
| 5 | 101 | 0.833 | 4.17 | 0.938 |
|  | 0 | 0.833 | 0.833 | 0.938 |
|  | 101 | 1.67 | 0.833 | 0.938 |
|  | 101 | 2.5 | 0.833 | 0.656 |
|  | 101 | 3.33 | 0.833 | 0.938 |
| 10 | 101 | 4.17 | 0.833 | 0.75 |
|  | 0 | 1.67 | 0.833 | 0.938 |
|  | 101 | 1.67 | 1.67 | 1.78 |
|  | 0 | 2.5 | 0.833 | 0.656 |
|  | 101 | 2.5 | 1.67 | 3 |
| 15 | 0 | 3.33 | 0.833 | 0.938 |
|  | 101 | 3.33 | 1.67 | 1.97 |
|  | 0 | 4.17 | 0.833 | 0.75 |
|  | 101 | 4.17 | 1.67 | 1.5 |
|  | 0 | 0.833 | 1.67 | 1.41 |
| 20 | 101 | 1.67 | 1.67 | 1.78 |
|  | 101 | 2.5 | 1.67 | 3 |
|  | 101 | 3.33 | 1.67 | 1.97 |
|  | 101 | 4.17 | 1.67 | 1.5 |
|  | 0 | 1.67 | 1.67 | 1.78 |
| 25 | 101 | 1.67 | 2.5 | 1.59 |
|  | 0 | 2.5 | 1.67 | 3 |
|  | 101 | 2.5 | 2.5 | 1.97 |
|  | 0 | 3.33 | 1.67 | 1.97 |
|  | 101 | 3.33 | 2.5 | 1.22 |
| 30 | 0 | 4.17 | 1.67 | 1.5 |
|  | 101 | 4.17 | 2.5 | 1.59 |

TABLE 3-continued

| ROW | PRINT CODE | X | Y | Z |
|---|---|---|---|---|
|  | 0 | 0.833 | 2.5 | 1.69 |
|  | 101 | 1.67 | 2.5 | 1.59 |
|  | 101 | 2.5 | 2.5 | 1.97 |
| 35 | 101 | 3.33 | 2.5 | 1.22 |
|  | 101 | 4.17 | 2.5 | 1.59 |
|  | 0 | 1.67 | 2.5 | 1.59 |
|  | 101 | 1.67 | 3.33 | 1.69 |
|  | 0 | 2.5 | 2.5 | 1.97 |
| 40 | 101 | 2.5 | 3.33 | 1.97 |
|  | 0 | 3.33 | 2.5 | 1.22 |
|  | 101 | 3.33 | 3.33 | 1.87 |
|  | 0 | 4.17 | 2.5 | 1.59 |
|  | 101 | 4.17 | 3.33 | 1.59 |
| 45 | 0 | 0.833 | 3.33 | 1.87 |
|  | 101 | 1.67 | 3.33 | 1.69 |
|  | 101 | 2.5 | 3.33 | 1.97 |
|  | 101 | 3.33 | 3.33 | 1.87 |
|  | 101 | 4.17 | 3.33 | 1.59 |
| 50 | 0 | 1.67 | 3.33 | 1.69 |
|  | 101 | 1.67 | 4.17 | 0.938 |
|  | 0 | 2.5 | 3.33 | 1.97 |
|  | 101 | 2.5 | 4.17 | 0.938 |
|  | 0 | 3.33 | 3.33 | 1.87 |
| 55 | 101 | 3.33 | 4.17 | 0.938 |
|  | 0 | 4.17 | 3.33 | 1.59 |
|  | 101 | 4.17 | 4.17 | 0.938 |
|  | 0 | 0.833 | 4.17 | 0.938 |
|  | 101 | 1.67 | 4.17 | 0.938 |
| 60 | 101 | 2.5 | 4.17 | 0.938 |
|  | 101 | 3.33 | 4.17 | 0.938 |
| 62 | 101 | 4.17 | 4.17 | 0.938 |

TABLE 4

| ROW | PRINT CODE | X | Y | Z |
|---|---|---|---|---|
| 1 | 0 | 0.589 | 1.02 | 0.938 |
|  | 101 | 0.374 | 1.83 | 1.41 |
|  | 101 | 0.158 | 2.63 | 1.69 |
|  | 101 | −0.0578 | 3.44 | 1.87 |
| 5 | 101 | −0.273 | 4.24 | 0.938 |
|  | 0 | 0.589 | 1.02 | 0.938 |
|  | 101 | 1.39 | 1.24 | 0.938 |
|  | 101 | 2.2 | 1.45 | 0.656 |
|  | 101 | 3 | 1.67 | 0.938 |
| 10 | 101 | 3.81 | 1.88 | 0.75 |
|  | 0 | 1.39 | 1.24 | 0.938 |
|  | 101 | 1.18 | 2.04 | 1.78 |
|  | 0 | 2.2 | 1.45 | 0.656 |
|  | 101 | 1.98 | 2.26 | 3 |
| 15 | 0 | 3 | 1.67 | 0.938 |
|  | 101 | 2.79 | 2.47 | 1.97 |
|  | 0 | 3.81 | 1.88 | 0.75 |
|  | 101 | 3.59 | 2.69 | 1.5 |
|  | 0 | 0.374 | 1.83 | 1.41 |
| 20 | 101 | 1.18 | 2.04 | 1.78 |
|  | 101 | 1.98 | 2.26 | 3 |
|  | 101 | 2.79 | 2.47 | 1.97 |
|  | 101 | 3.59 | 2.69 | 1.5 |
|  | 0 | 1.18 | 2.04 | 1.78 |
| 25 | 101 | 0.963 | 2.85 | 1.59 |
|  | 0 | 1.98 | 2.26 | 3 |
|  | 101 | 1.77 | 3.06 | 1.97 |
|  | 0 | 2.79 | 2.47 | 1.97 |
|  | 101 | 2.57 | 3.28 | 1.22 |
| 30 | 0 | 3.59 | 2.69 | 1.5 |
|  | 101 | 3.38 | 3.49 | 1.59 |
|  | 0 | 0.158 | 2.63 | 1.69 |
|  | 101 | 0.963 | 2.85 | 1.59 |
|  | 101 | 1.77 | 3.06 | 1.97 |
| 35 | 101 | 2.57 | 3.28 | 1.22 |
|  | 101 | 3.38 | 3.49 | 1.59 |
|  | 0 | 0.963 | 2.85 | 1.59 |
|  | 101 | 0.747 | 3.65 | 1.69 |
|  | 0 | 1.77 | 3.06 | 1.97 |
| 40 | 101 | 1.55 | 3.87 | 1.97 |
|  | 0 | 2.57 | 3.28 | 1.22 |
|  | 101 | 2.36 | 4.08 | 1.87 |
|  | 0 | 3.38 | 3.49 | 1.59 |
|  | 101 | 3.16 | 4.3 | 1.59 |

TABLE 4-continued

| ROW | PRINT CODE | X | Y | Z |
|---|---|---|---|---|
| 45 | 0 | −0.0578 | 3.44 | 1.87 |
|  | 101 | 0.747 | 3.65 | 1.69 |
|  | 101 | 1.55 | 3.87 | 1.97 |
|  | 101 | 2.36 | 4.08 | 1.87 |
|  | 101 | 3.16 | 4.3 | 1.59 |
| 50 | 0 | 0.747 | 3.65 | 1.69 |
|  | 101 | 0.531 | 4.46 | 0.938 |
|  | 0 | 1.55 | 3.87 | 1.97 |
|  | 101 | 1.34 | 4.67 | 0.938 |
|  | 0 | 2.36 | 4.08 | 1.87 |
| 55 | 101 | 2.14 | 4.89 | 0.938 |
|  | 0 | 3.16 | 4.3 | 1.59 |
|  | 101 | 2.95 | 5.1 | 0.938 |
|  | 0 | −0.273 | 4.24 | 0.938 |
|  | 101 | 0.531 | 4.46 | 0.938 |
| 60 | 101 | 1.34 | 4.77 | 0.938 |
|  | 101 | 2.14 | 4.89 | 0.938 |
| 62 | 101 | 2.95 | 5.1 | 0.938 |

TABLE 5

| ROW | PRINT CODE | X | Y | Z |
|---|---|---|---|---|
| 1 | 0 | 0.589 | 1.28 | −0.529 |
|  | 101 | 0.374 | 2.05 | −1.06 |
|  | 101 | 0.158 | 2.64 | −1.67 |
|  | 101 | −0.0578 | 3.15 | −2.32 |
| 5 | 101 | −0.273 | 2.64 | −3.45 |
|  | 0 | 0.589 | 1.28 | −0.529 |
|  | 101 | 1.39 | 1.37 | −0.724 |
|  | 101 | 2.2 | 1.21 | −1.04 |
|  | 101 | 3 | 1.55 | −1.12 |
| 10 | 101 | 3.81 | 1.48 | −1.39 |
|  | 0 | 1.39 | 1.37 | −0.724 |
|  | 101 | 1.18 | 2.48 | −1.1 |
|  | 0 | 2.2 | 1.21 | −1.04 |
|  | 101 | 1.98 | 3.67 | −0.778 |
| 15 | 0 | 3 | 1.55 | −1.12 |
|  | 101 | 2.79 | 2.83 | −1.41 |
|  | 0 | 3.81 | 1.48 | −1.39 |
|  | 101 | 3.59 | 2.5 | −1.8 |
|  | 0 | 0.374 | 2.05 | −1.06 |
| 20 | 101 | 1.18 | 2.48 | −1.1 |
|  | 101 | 1.98 | 3.67 | −0.778 |
|  | 101 | 2.79 | 2.83 | −1.41 |
|  | 101 | 3.59 | 2.5 | −1.8 |
|  | 0 | 1.18 | 2.48 | −1.1 |
| 25 | 101 | 0.963 | 2.65 | −1.91 |
|  | 0 | 1.98 | 3.67 | −0.778 |
|  | 101 | 1.77 | 3.08 | −1.94 |
|  | 0 | 2.79 | 2.83 | −1.41 |
|  | 101 | 2.57 | 2.49 | −2.46 |
| 30 | 0 | 3.59 | 2.5 | −1.8 |
|  | 101 | 3.38 | 2.92 | −2.49 |
|  | 0 | 0.158 | 2.64 | −1.67 |
|  | 101 | 0.963 | 2.65 | −1.91 |
|  | 101 | 1.77 | 3.08 | −1.94 |
| 35 | 101 | 2.57 | 2.49 | −2.46 |
|  | 101 | 3.38 | 2.92 | −2.49 |
|  | 0 | 0.963 | 2.65 | −1.91 |
|  | 101 | 0.747 | 3.07 | −2.6 |
|  | 0 | 1.77 | 3.08 | −1.94 |
| 40 | 101 | 1.55 | 3.42 | −2.67 |
|  | 0 | 2.57 | 2.49 | −2.46 |
|  | 101 | 2.36 | 3.42 | −2.91 |
|  | 0 | 3.38 | 2.92 | −2.49 |
|  | 101 | 3.16 | 3.26 | −3.22 |
| 45 | 0 | −0.0578 | 3.15 | −2.32 |
|  | 101 | 0.747 | 3.07 | −2.6 |
|  | 101 | 1.55 | 3.42 | −2.67 |
|  | 101 | 2.36 | 3.42 | −2.91 |
|  | 101 | 3.16 | 3.26 | −3.22 |
| 50 | 0 | 0.747 | 3.07 | −2.6 |
|  | 101 | 0.531 | 2.73 | −3.64 |
|  | 0 | 1.55 | 3.42 | −2.67 |
|  | 101 | 1.34 | 2.82 | −3.84 |
|  | 0 | 2.36 | 3.42 | −2.91 |
| 55 | 101 | 2.14 | 2.92 | −4.03 |
|  | 0 | 3.16 | 3.26 | −3.22 |
|  | 101 | 2.95 | 3.01 | −4.23 |

TABLE 5-continued

| ROW | PRINT CODE | X | Y | Z |
|---|---|---|---|---|
|  | 0 | 0.273 | 2.64 | −3.45 |
|  | 101 | 0.531 | 2.73 | −3.64 |
| 60 | 101 | 1.34 | 2.82 | −3.84 |
|  | 101 | 2.14 | 2.92 | −4.03 |
| 62 | 101 | 2.95 | 3.01 | −4.23 |

TABLE 6

| ROW | PRINT CODE | X | Y | Z |
|---|---|---|---|---|
| 1 | 0 | 0.589 | 1.28 |  |
|  | 101 | 0.374 | 2.05 |  |
|  | 101 | 0.158 | 2.64 |  |
|  | 101 | −0.0578 | 3.15 |  |
| 5 | 101 | −0.273 | 2.64 |  |
|  | 0 | 0.589 | 1.28 |  |
|  | 101 | 1.39 | 1.37 |  |
|  | 101 | 2.2 | 1.21 |  |
|  | 101 | 3 | 1.55 |  |
| 10 | 101 | 3.81 | 1.48 |  |
|  | 0 | 1.39 | 1.37 |  |
|  | 101 | 1.18 | 2.48 |  |
|  | 0 | 2.2 | 1.21 |  |
|  | 101 | 1.98 | 3.67 |  |
| 15 | 0 | 3 | 1.55 |  |
|  | 101 | 2.79 | 2.83 |  |
|  | 0 | 3.81 | 1.48 |  |
|  | 101 | 3.59 | 2.5 |  |
|  | 0 | 0.374 | 2.05 |  |
| 20 | 101 | 1.18 | 2.48 |  |
|  | 101 | 1.98 | 3.67 |  |
|  | 101 | 2.79 | 2.83 |  |
|  | 101 | 3.59 | 2.5 |  |
|  | 0 | 1.18 | 2.48 |  |
| 25 | 101 | 0.963 | 2.65 |  |
|  | 0 | 1.98 | 3.67 |  |
|  | 101 | 1.77 | 3.08 |  |
|  | 0 | 2.79 | 2.83 |  |
|  | 101 | 2.57 | 2.49 |  |
| 30 | 0 | 3.59 | 2.5 |  |
|  | 101 | 3.38 | 2.92 |  |
|  | 0 | 0.158 | 2.64 |  |
|  | 101 | 0.963 | 2.65 |  |
|  | 101 | 1.77 | 3.08 |  |
| 35 | 101 | 2.57 | 2.49 |  |
|  | 101 | 3.38 | 2.92 |  |
|  | 0 | 0.963 | 2.65 |  |
|  | 101 | 0.747 | 3.07 |  |
|  | 0 | 1.77 | 3.08 |  |
| 40 | 101 | 1.55 | 3.42 |  |
|  | 0 | 2.57 | 2.49 |  |
|  | 101 | 2.36 | 3.42 |  |
|  | 0 | 3.38 | 2.92 |  |
|  | 101 | 3.16 | 3.26 |  |
| 45 | 0 | −0.0578 | 3.15 |  |
|  | 101 | 0.747 | 3.07 |  |
|  | 101 | 1.55 | 3.42 |  |
|  | 101 | 2.36 | 3.42 |  |
|  | 101 | 3.16 | 3.26 |  |
| 50 | 0 | 0.747 | 3.07 |  |
|  | 101 | 0.531 | 2.73 |  |
|  | 0 | 1.55 | 3.42 |  |
|  | 101 | 1.34 | 2.82 |  |
|  | 0 | 2.36 | 3.42 |  |
| 55 | 101 | 2.14 | 2.92 |  |
|  | 0 | 3.16 | 3.26 |  |
|  | 101 | 2.95 | 3.01 |  |
|  | 0 | −0.273 | 2.64 |  |
|  | 101 | 0.531 | 2.73 |  |
| 60 | 101 | 1.34 | 2.82 |  |
|  | 101 | 2.14 | 2.92 |  |
| 62 | 101 | 2.95 | 3.01 |  |

TABLE 7

| ROW | PRINT CODE | X | Y |
|---|---|---|---|
| 1 | 0 | 1557 | 900.7 |
|  | 101 | 1467 | 1218 |
|  | 101 | 1378 | 1464 |
|  | 101 | 1289 | 1675 |
| 5 | 101 | 1199 | 1464 |
|  | 0 | 1557 | 900.7 |
|  | 101 | 1890 | 938.4 |
|  | 101 | 2224 | 870.6 |
|  | 101 | 2557 | 1014 |
| 10 | 101 | 2891 | 981.3 |
|  | 0 | 1890 | 938.4 |
|  | 101 | 1801 | 1396 |
|  | 0 | 2224 | 870.6 |
|  | 101 | 2134 | 1891 |
| 15 | 0 | 2557 | 1014 |
|  | 101 | 2468 | 1542 |
|  | 0 | 2891 | 981.3 |
|  | 101 | 2801 | 1404 |
|  | 0 | 1467 | 1218 |
| 20 | 101 | 1801 | 1396 |
|  | 101 | 2134 | 1891 |
|  | 101 | 2468 | 1542 |
|  | 101 | 2801 | 1404 |
|  | 0 | 1801 | 1396 |
| 25 | 101 | 1712 | 1467 |
|  | 0 | 2134 | 1891 |
|  | 101 | 2045 | 1645 |
|  | 0 | 2468 | 1542 |
|  | 101 | 2378 | 1401 |
| 30 | 0 | 2801 | 1404 |
|  | 101 | 2712 | 1580 |
|  | 0 | 1378 | 1464 |
|  | 101 | 1712 | 1467 |
|  | 101 | 2045 | 1645 |
| 35 | 101 | 2378 | 1401 |
|  | 101 | 2712 | 1580 |
|  | 0 | 1712 | 1467 |
|  | 101 | 1622 | 1643 |
|  | 0 | 2045 | 1645 |
| 40 | 101 | 1956 | 1786 |
|  | 0 | 2378 | 1401 |
|  | 101 | 2289 | 1789 |
|  | 0 | 2712 | 1580 |
|  | 101 | 2623 | 1721 |
| 45 | 0 | 1289 | 1675 |
|  | 101 | 1622 | 1643 |
|  | 101 | 1956 | 1786 |
|  | 101 | 2289 | 1789 |
|  | 101 | 2623 | 1721 |
| 50 | 0 | 1622 | 1643 |
|  | 101 | 1533 | 1502 |
|  | 0 | 1956 | 1786 |
|  | 101 | 1866 | 1540 |
|  | 0 | 2289 | 1789 |
| 55 | 101 | 2200 | 1578 |
|  | 0 | 2623 | 1721 |
|  | 101 | 2533 | 1615 |
|  | 0 | 1199 | 1464 |
|  | 101 | 1533 | 1502 |
| 60 | 101 | 1866 | 1540 |
|  | 101 | 2200 | 1578 |
| 62 | 101 | 2533 | 1615 | attached to a computer and a printer. A stored APL program in the computer controls the drawing operation in the printer based upon initial surface matrix data inputted to the system from the keyboard. In particular, a surface chart is drawn by a Tektronix 618 display writer which includes a vector display unit. A hard copy is produced by a Tektronix 4631 hard copy unit attached to the 618-display unit. the 4631 hard copy unit seems to be some kind of a thermal CRT-printer. The invention is also implemented on an IBM type 3279 graphic display. The application may be programmed to run a plotter if desired.

We claim:

1. A method performed by a general computer for removing hidden lines in a two dimensional surface chart disclosing an image of a three-dimensional surface, including the steps of:

(a) storing in a computer memory the X, Y and Z co-ordinates of selected points (A, B, C, D, E) of the surface as a first matrix;

(b) transforming in the computer the first matrix into a second matrix indicating a drawing sequence through the selected points;

(c) rotation in the computer the points of the second matrix around the z-axis a first angle $\alpha$;

(d) rotating in the computer said rotated second matrix points around the x-axis at a second angle $\beta$; and (e) drawing the two-dimensional surface chart in accordance with an indicated sequence using the X and Y coordinate values of the rotated points in step (d), wherein this drawing step includes the steps of:

performing a drawing operation of X-traces, and X-trace being defined as a line passing through points having substantially the same Y values in said first matrix; and performing, after an X-trace drawing operation has been performed, a plurality of $\Delta$Y-trace drawing operations between last drawn X-trace and a next to be drawn X-trace;

a Y-trace being defined as a line passing through points having substantially the same X values in the first matrix, and a $\Delta$Y-traces being defined as the part of a Y-trace extending between two adjacent X-traces;

said sequential drawing operation proceeding in sequence from low Y-value X-traces toward high Y-value X-traces; and the drawing of X-traces and $\Delta$Y-traces during said performed drawing operations being limited to lines drawn outside a forbidden area defined by the computer as an area surrounded by previously drawn lines.

2. A method according to the claim 21 wherein the forbidden area is defined as an area falling between an upper horizon and a lower horizon.

3. A method according to the claim 2 wherein the forbidden area between the upper and lower horizon is sequentially increased by the computer when the drawing operation is proceeding.

4. A method according to the claim 3 wherein the upper horizon in a starting stage of the operation extends from an initial low value at a first bound U1–U2 of said upper horizon up to an end point (E1) of a first Y-trace (A1, B1, C1, D1, E1), follows said Y-trace, follows a X-trace (A1, A2, A3, A4, A5) and drops down to said initial low value at a second bound U3–U4 of said upper horizon.

5. A method according to the claim 4 wherein the upper horizon in a second stage of an operation (FIG. 6) follows the second X-trace (B1, B2, B3, B4, B5) instead of the first X-trace, whereas the lower horizon remains unchanged, whereby the forbidden area is formed between the first and second X-traces.

6. A method according to the claim 3 wherein the lower horizon in a starting stage of the operation extends from an initial high value at a first bound L1–L2 of said lower horizon down to an end point (E1) of a first Y-trace (A1, B1, C1, D1, E1), follows said Y-trace, follows a first X-trace (A1, A2, A3, A4, A5) and jumps up to said initial high value at a second bound L3–L4 of said lower horizon.

7. A method according to the claim 1 wherein said matrix transformation includes assigning drawn—no drawn parameters to each matrix row.

8. A method according to the claim 1 wherein said matrix transformation includes an origin translation and a magnitude transformation of the co-ordinate values before the rotation step in step (c).

9. A method according to the claim 1 wherein an origin translation and a magnitude transformation is executed after the rotation operation of step (d) but before the drawing operation of step (e).

10. A method according to claim 1 including the steps of:

storing in computer memory information defining upper and lower horizons and continuously updating said upper and lower horizons for each drawing operation outside the present forbidden area.

11. A method according to claim 1 wherein drawing rules for the X and Y co-ordinates are exchanged when the frotation angle $\alpha$ around the Z-axis exceeds a predetermined value.

12. A method according to claim 1 wherein the number of co-ordinate points stored for the upper and lower horizon is a magnitude higher than the number of co-ordinate points stored for the selected points of the three-dimensional surface.

13. A method according to claim 1 wherein the performing of each drawing operation between any two points along a trace includes making incremental line segments where some increments for lines drawn are in the Y direction and other increments for lines drawn are in the X direction, and wherein a check is made by the computer inhibiting the subsequent drawing of line segment increments that fall within that forbidden area.

14. A method according to claim 13 including the further step of updating in the computer, the horizon information stored for each incremental drawing operation step outside the forbidden area.

15. A method according to claim 13 wherein the making of incremental line segments includes computing the angle between the line to be drawn and the X axis, and positioning increments along the X direction when the computed angle is less than 45°, and positioning increments along the Y direction when the computed angle is greater than or equal to 45°.

16. A computerized method for displaying, from a given desired point of viewing, a three-dimensional surface on a two-dimensional display having a first coordinate and a second coordinate, the method comprising the steps of:

(a) storing in computer memory (first coordinate, second coordinate) respective pairs of values for points lying on the surface of the object; and (b) where an first-coordinate trace corresponds to stored points which lie along the surface of the object and have the same stored first-coordinate value, and where a $\Delta$COORD—trace corresponds to points along a line that extends between adjacent first-coordinate traces, and where succesive first-coordinate traces are successively further away from the point of viewing, (i) performing, on the display, a drawing operation along a previously undrawn first-coordinate trace $T_i$ (where i is an integer) which is nearest the point of viewing;

(ii) performing, on the display, a drawing operation along $\Delta$COORD—traces extending from trace $T_i$ to trace $T_{i+1}$;

(iii) repeating steps (b)(i) and (b)(ii) in alternation; and
(iv) where a forbidden area is defined as the largest area surrounded by lines previously drawn in performed drawing operations, updating the forbidden area after each first-coordinate trace and each ΔCOORD—trace drawing operation is performed;

wherein said step (b)(i) includes the step of drawing a line only along that portion of the previously undrawn first-coordinate trace $T_i$ which is not in the forbidden area; and wherein said step (b)(ii) includes the step of drawing a line only along that portion of ΔCOORD—traces which are not in the forbidden area.

17. A computerized method for displaying, from a given desired point of viewing, a three-dimensional surface on a two-dimensional display in which points thereon have an X-coordinate and a Y-coordinate, the method comprising the steps of:

(a) storing, in computer memory, coordinates for points lying on the three-dimensional surface; and
(b) where an X-trace corresponds to stored points which lie along the three-dimensional surface and have at least substantially the same stored X-coordinate value, and where a ΔY—trace corresponds to points along a line of characterized by a substantially uniform Y-cordinate value wherein each ΔY—trace extends between two adjacent X-traces, and where successive X-traces are successively further away from the point of viewing, (i) performing, on the display, a drawing operation along a previously undrawn X-trace $X_j$ (where j is an integer) which is nearest the point of viewing;

(ii) performing, on the display, a drawing operation along ΔY–traces extending from trace $X_j$ to trace $X_{j+1}$;
(iii) repeating steps (b)(i) and (b)(ii) in alternation for successive values of j; and
(iv) where a forbidden area is defined as the largest area surrounded by lines previously drawn in performed drawing operations, updating the forbidden area after each X-trace and ΔY–trace drawing operation is performed;

wherein said step (b)(i) includes the step of drawing a line only along that portion of the previously undrawn X-trace $x_i$ which is not in the forbidden area; and wherein said step (b)(ii) includes the step of drawing a line only along those portions of the Δy-traces which are not in the forbidden area.

18. The method of claim 17 comprising the further steps of:

initially drawing the nearest X-trace to the point of viewing and drawing a Y-trace that starts at one end of the initially drawn X-trace and that extends to successive stored points that have (i) the same X-coordinate value as said one end of the initially drawn X-trace and (ii) Y-coordinate values that are successively more distant from the initially drawn X-trace;

wherein the initially drawn X-trace and Y-trace together with the lines drawn in accordance with steps (b)(i) and (b)(ii) define the lines that form the two-dimensional image with hidden lines removed.

19. The method of claim 18 comprising the further step of: rotating the X-coordinates and Y-coordinates about predefined angles so that the two-dimensional display projects the three-dimensional surface from the desired point of viewing.

* * * * *